Feb. 15, 1966  A. H. BLODGETT  3,234,720
COMBINED CULTIVATOR AND WEED RAKE
Filed Dec. 3, 1963
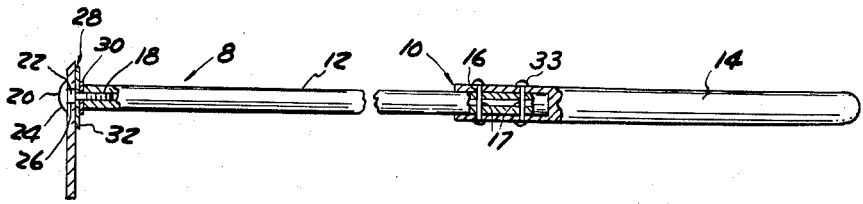
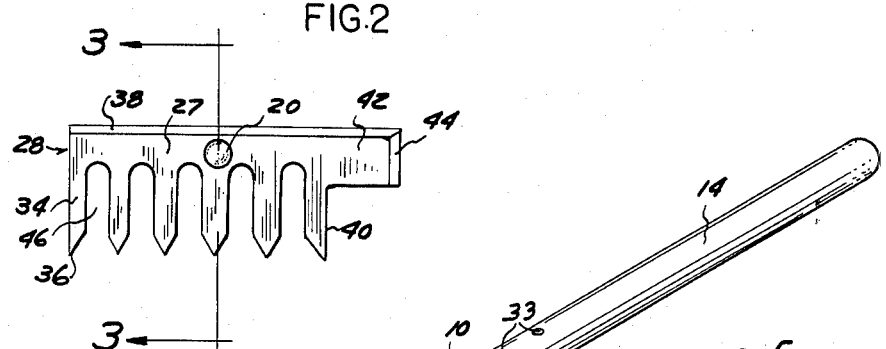
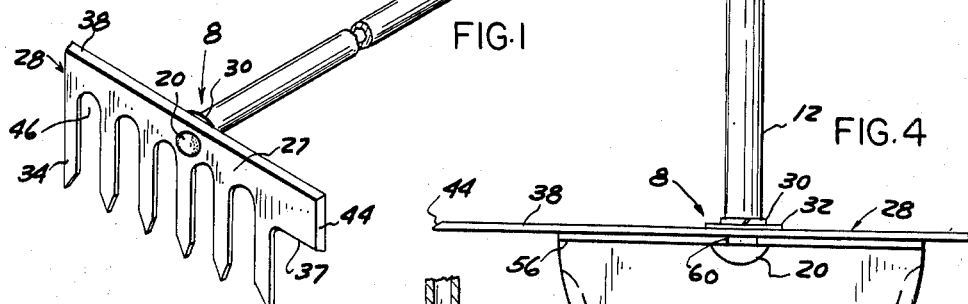
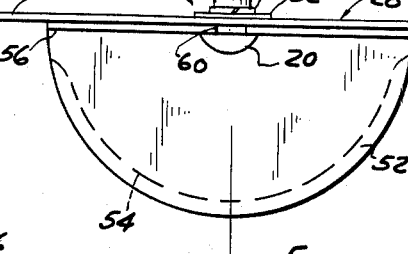
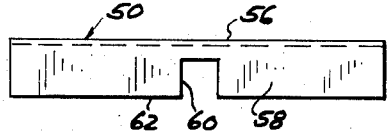
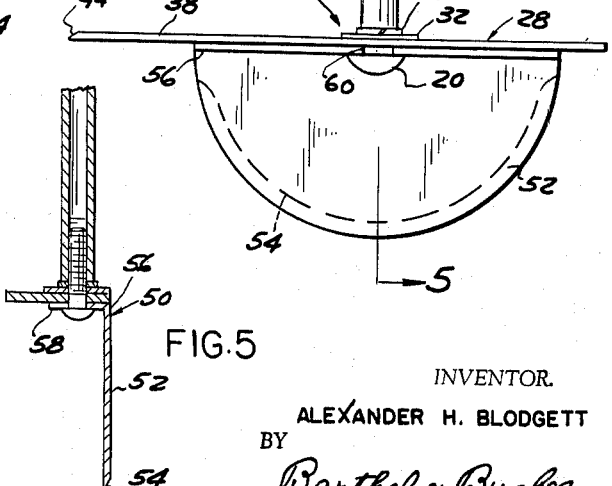
INVENTOR.
ALEXANDER H. BLODGETT
BY *Barthel & Bugbee*
ATTORNEYS

# United States Patent Office 3,234,720
Patented Feb. 15, 1966

3,234,720
COMBINED CULTIVATOR AND WEED RAKE
Alexander H. Blodgett, 444 Plymouth Road, Apt. 21, Plymouth, Mich.
Filed Dec. 3, 1963, Ser. No. 327,604
1 Claim. (Cl. 56—400.05)

This invention relates to garden tools and, in particular to rakes.

One object of this invention is to provide a combined cultivator and weed rake which also has cutting edges whereby the gardener can rake and cut weeds without changing tools.

Another object is to provide a combined cultivator and weed rake of the foregoing character having an improved means of connecting the rake blade to the handle so as to positively prevent rotation of the rake blade relatively to the handle.

Another object is to provide a combined cultivator and weed rake of the foregoing character having an attachable and detachable trimmer which is quickly and easily applied to and removed from the end of the rake for trimming operations around the edge of a flower bed or lawn.

Other objects and advantages of the invention will become apparent during the course of the following description of the accompanying drawings, wherein:

FIGURE 1 is a perspective view of my combined cultivator and weed rake, according to one form of the invention, with a portion of the handle omitted to conserve space;

FIGURE 2 is a front elevation of the combined cultivator and weed rake shown in FIGURE 1;

FIGURE 3 is a longitudinal section through the combined cultivator and weed rake shown in FIGURE 1, taken along the line 3—3 in FIGURE 2;

FIGURE 4 is a rear elevation of the rake of FIGURES 1 to 3 inclusive in a vertical position for trimming, with a detachable trimmer temporarily mounted thereon;

FIGURE 5 is a longitudinal section taken along the line 5—5 in FIGURE 4; and

FIGURE 6 is a top plan view of the detachable trimmer removed from the rake.

Referring to the drawing in detail, FIGURE 1 shows a combined cultivator and weed rake, generally designated 8, according to one form of the invention as having a handle structure 10 including a hollow pipe rod 12 having a wooden handle 14 pressfitted on the upper end thereof into a socket 16 (FIGURE 3). The lower end of the pipe rod 12 is threaded internally at 18 to receive a carriage bolt 20 of the type which has a square shank portion 22 beneath the head 24 (FIGURE 3), the square shank portion 22 fitting a correspondingly square hole 26 in the plate-shaped upper base portion 27 of the rake blade, generally designated 28. A lock washer 30 and a plain washer 32 are mounted between the end of the pipe rod 12 adjacent its internally-threaded portion 18 and the rearward side of the rake blade 28 to restrain relative rotation therebetween. Rivets 33 connect the handle 14 to the pipe rod 12 and prevent relative rotation therebetween.

The rake blade 28 has spaced tines 34 with sharp points 36 depending from the base portion 27 thereof and a beveled upper cutting edge 38 on the top of the base portion 27. The right-hand end tine 40 (FIGURE 2), however, is shorter than the remaining tines 34 because of the fact that the right-hand end portion of the blade 28 has a lateral extension 42, the outer end of which is provided with a beveled cutting edge 44 perpendicular to the top cutting edge 38. The tines 34 and 40 are separated from one another by U-shaped cutaway portions 46.

Attachable to the combined cultivator and weed rake 8 is a trimmer 50 (FIGURES 4, 5 and 6) consisting of a semi-circular trimmer blade 52 (FIGURE 4) provided with an arcuate beveled cutting edge 54. Integral with the upper edge 56 of the blade 52 is a perpendicular top flange 58 having a square notch 60 extending inward from the rearward edge 62 thereof and of substantially the same size as the square portion 22 of the bolt 20 so as to fit snugly thereover (FIGURE 5).

In mounting the rake blade 28 upon the handle rod 12, the user inserts the square portion 22 of the bolt 20 through the square hole 26 in the rake blade 28 and then screws the handle rod 12 onto the threaded shank of the bolt 20 by rotating the handle 14 while gripping it between the palm and fingers of one hand while holding the rake blade 28 in the other hand or in a vise, or by standing on the rake blade 28 while grasping the handle 14 in both hands and rotating it, until the parts are tightly assembled.

In the use of the combined cultivator and weed rake 8, the user employs the tines 34 of the rake blade 28 in a downwardly-pointed direction to rake leaves, weeds or dirt in the usual manner. To cut an object, such as the stem of a weed, the user swings the handle 14 into a vertical position so as to position the rake blade 28 horizontally, whereupon he swings the blade 28 horizontally to employ either the top cutting edge 38 or the side cutting edge 44 as he desires. Cutting with either edge 38 or 44 is easily done by swinging the rake blade 28 in an arcuate path by the handle 14 somewhat in the manner of swinging a golf club.

To attach the trimmer 50 (FIGURES 4, 5 and 6), the user holds the rake blade 28 in one hand or in a vise while he rotates the handle to unscrew the handle rod 12 from the bolt 20. This permits the square shank portion 22 of the bolt 20 to be withdrawn partway from the hole 26 in the rake blade 28, thereby opening up a gap between the bolt head 24 and the rake blade 28 (FIGURES 4 and 5). The user then slides the notch 60 of the flange 58 into this gap and over the square portion 22 of the bolt 20, whereupon he then rotates the handle 14 to pull the head 24 of the bolt 20 tightly into engagement with the flange 58 of the trimmer 50 and the flange 58 into abutting engagement with the rake blade 28, thereby solidly securing the trimmer 50 to the handle rod 12. The rake blade 28 thus increases the strength and rigidity of the assembly by serving as an abutment or back-up plate for the trimmer 50.

In the use of the rake 8 equipped with the trimmer 50, the operator holds the handle 14 in a vertical position so that the trimmer blade 52 lies in a vertical plane. He then places the cutting edge 54 at the location where trimming is to be accomplished and, while bearing down on the handle 14 with the weight of his body, he rocks the trimmer 50 back and forth by swinging the handle 14 to and fro, causing the arcuate cutting edge 54 to rock relatively to the turf to be cut, severing the cut portion of the turf from the main portion thereof. After use, the trimmer 50 is detached by reversing the foregoing attaching procedure, namely by rotating the handle 14 to loosen the grip of the handle rod 12 upon the bolt 20. The notched portion 60 of the flange 58 is then easily slid off the squared shank portion 22 of the bolt 20 and the handle 14 then rotated in the opposite direction to again tighten the rake blade 28 securely on the handle rod 14.

What I claim is:
A combined cultivator and weed rake, comprising
an elongated handle structure having a forward section with its forward end portion containing a threaded bore,
a rake blade having a base portion with multiple laterally-spaced tines depending therefrom, said base portion having a substantially square hole in the approximate midportion thereof,
a bolt having a head, a portion of square cross-section of the size of said hole disposed adjacent said head, and a threaded shank projecting from said square-cross-section portion,
and an anti-rotational locking device disposed between said rake blade and the forward end of said forward section of said handle structure,
said shank extending through said base portion hole and through said locking device into threaded engagement with said bore with said square-cross-section portion snugly fitting said hole and with said bolt head holding said base portion of said blade tightly against said locking device and said locking device tightly against the forward end of said handle structure.

References Cited by the Examiner

UNITED STATES PATENTS

| | | | |
|---|---|---|---|
| 908,266 | 12/1908 | Jackson | 56—400.05 |
| 1,120,062 | 12/1914 | Krabill | 56—400.05 |
| 2,010,325 | 8/1935 | Sawyer | 56—400.05 |
| 2,795,923 | 6/1957 | Kapuczin | 56—400.05 |
| 2,821,834 | 2/1958 | Walker | 56—400.19 |

ABRAHAM G. STONE, *Primary Examiner.*

ANTONIO F. GUIDA, *Examiner.*